Figure 1:
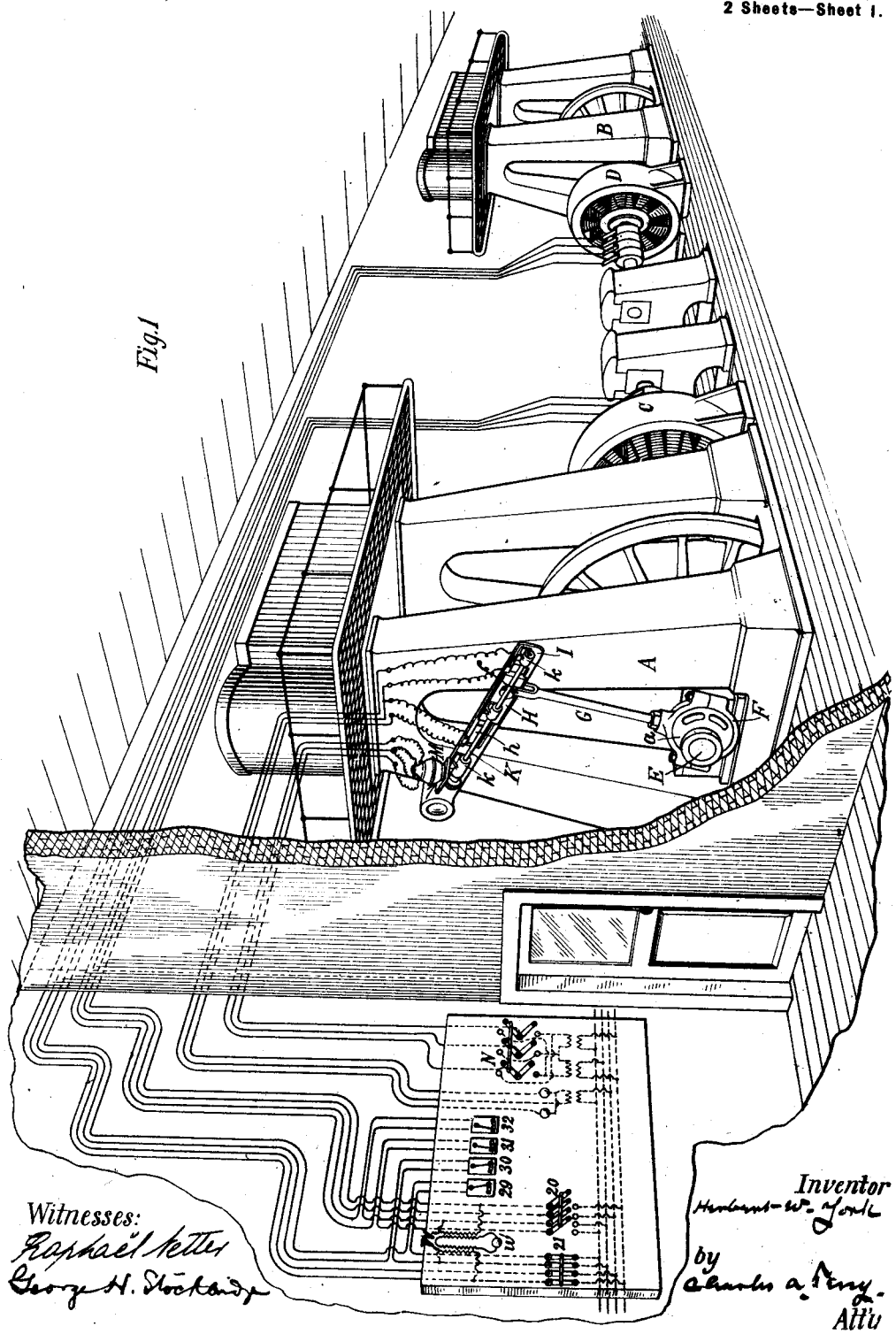

No. 668,431. Patented Feb. 19, 1901.
H. W. YORK.
METHOD OF SYNCHRONIZING ALTERNATING CURRENT GENERATORS.
(Application filed May 11, 1900.)
(No Model.) 2 Sheets—Sheet 1.

Witnesses:

Inventor
Herbert W. York
by Charles A. Terry.
Att'y

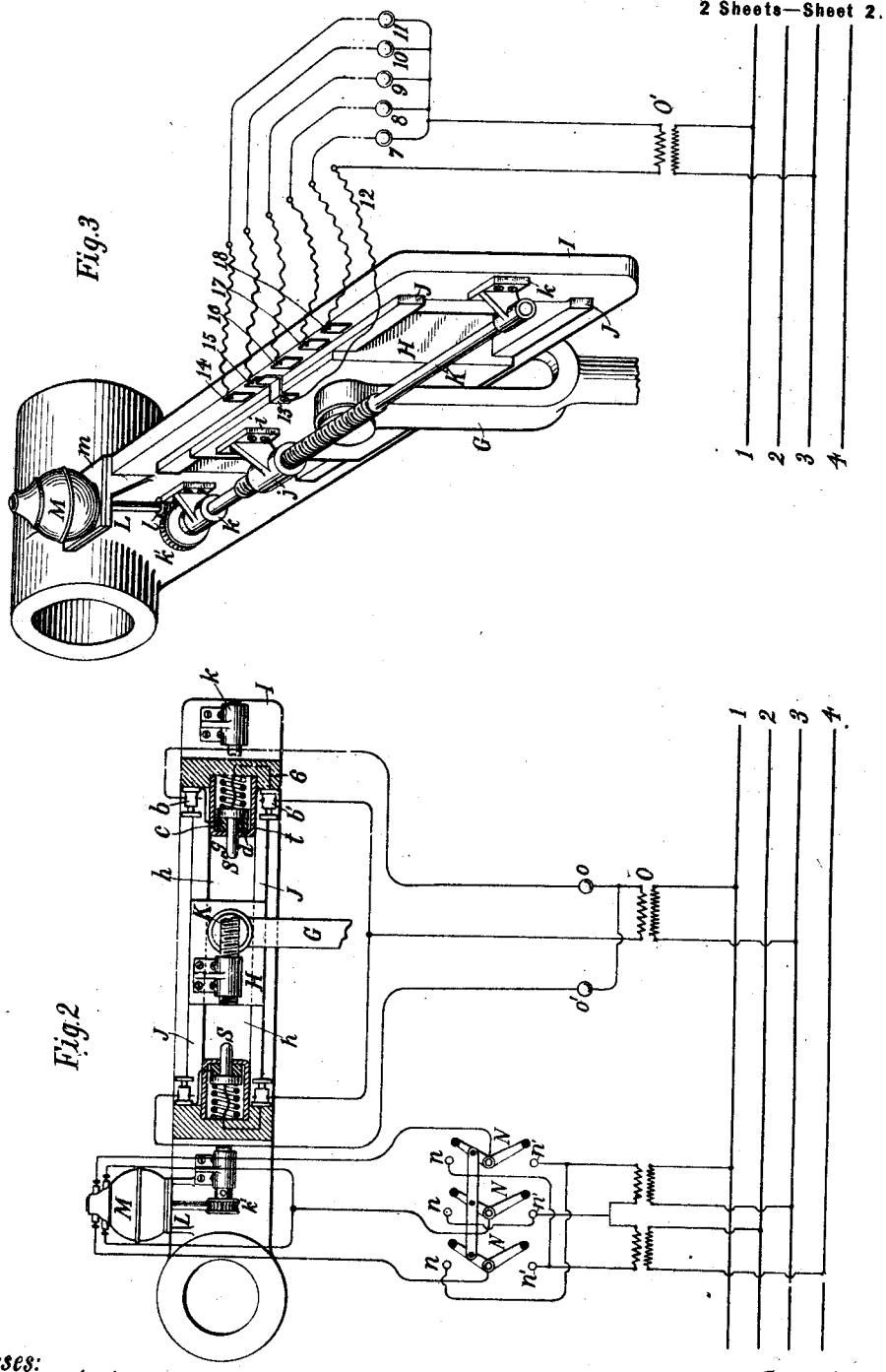

UNITED STATES PATENT OFFICE.

HERBERT W. YORK, OF NEW YORK, N. Y.

METHOD OF SYNCHRONIZING ALTERNATING-CURRENT GENERATORS.

SPECIFICATION forming part of Letters Patent No. 668,431, dated February 19, 1901.

Application filed May 11, 1900. Serial No. 16,275. (No model.)

*To all whom it may concern:*

Be it known that I, HERBERT W. YORK, a citizen of the United States, and a resident of New York, in the county of New York and State of New York, have invented certain new and useful Improvements in Methods of Synchronizing Alternating-Current Generators, of which the following is a specification.

My invention relates to novel systems and arrangements for bringing an alternating-current generator into synchronism with one or more other alternating-current generators and for causing such generators when so synchronized for supplying a given set of circuits to divide up the load in any desired manner. In order to accomplish this result, I provide means for regulating the speed of the several driving-engines for the alternators, such means consisting, broadly, of a lever of variable length interposed in the valve mechanism of each engine and specifically of devices for controlling the valve cut-off of each engine through the medium of a sliding block within the rocker-arm upon the rock-shaft of the said engine, the position of the said sliding block determining the width of the valve-opening in a manner well understood. In carrying out my invention I increase its utility by putting the artificial means for moving the sliding block under the control of the switchboard operator. To this end I place upon the usual switchboard for an alternating-current-generating station a set of circuit-controllers, and I connect the said circuit-controllers with an electric motor at each engine, which motor is adapted to move the sliding block back and forth with the rocker-arm, and thus control the speed of the engine. In place of electric motors controlled by switches in the switchboard-room I may employ air-motors or other translators of power, placing the controlling devices for the said motors at or near the switchboard. In case it is not desirable to operate the block from a distance the same may be moved by hand by a system of levers, a hand-wheel, or any other suitable device.

It has been heretofore a matter of considerable difficulty, often requiring not a little time, to switch an alternating generator into circuit with one or more generators already running, owing principally to the fact that it is difficult to regulate the speed of the controlling-engines within a reasonable degree of precision. More than that, it has been difficult for the same reason to keep the generators at work under substantially the same conditions of load, inasmuch as an alternator connected with a lagging engine will maintain synchronism with the other alternators, not because the engine keeps it up to its work, but because the other alternators will relieve it of a portion of its load or will supply it with sufficient current to operate it at equal speed as a motor. In this way it may happen that an alternating generator may shirk the greater part of its load while running at the same speed as the other machines. The readings of the ammeter may show that such an alternator is supplying little or no current to the working circuit, which will indicate the need of pushing forward the driving-engine of the alternator until it holds the machine to its work. I find that by using a sliding block such as I have described and attaching it to a connecting-rod operated from an eccentric on the main engine-shaft I can regulate the speed of the engine with great certainty and can keep it regulated and the load divided with comparative ease. When I combine with the excellencies of the regulator as such the advantage of controlling it from the station-switchboard, I produce a synchronizing system which is in practice exceedingly sensitive and exact in its operation, fully meeting all the requirements of actual service.

By special devices not heretofore mentioned I make it possible for the switchboard operator to know whether or not the sliding block is at one end of its excursion or the other, representing the limits of high and low speed for the engine. I may also provide a means for indicating to the switch operator the actual position of the sliding block, whether at the extreme of its movement or not. Knowing the position of the sliding block and in what direction it is necessary to move it in order to produce a hastening or slowing of the engine's speed, as the switchboard-indicators show to be required, the operator by actuating a switch or set of switches in the proper manner may cause the motor to move the said block in the desired direction, For the purpose of illustration I have shown only one sliding block attached to a single engine and one switch on the switchboard for operating it. In practice every engine may have such a sliding block and may also have its proper switch for accomplishing the movement of the block.

In the drawings, Figure 1 is a general perspective view showing a station-switchboard and two engines in a separate compartment operating alternating-current generators, one of my sliding blocks being shown in connection with one of the said engines only. Fig. 2 illustrates in side elevation and partly in section the rocker-arm and sliding block, together with means for indicating when the block has reached one or the other of its extreme positions; and Fig. 3 is a perspective of the said rocker-arm and the sliding block, showing in addition thereto the means I have devised for indicating the position of the block at any point of its travel.

Referring to the drawings by letters and figures, A and B are engines operating alternating-current generators C and D, respectively. The main shaft E of the engine A carries an eccentric $a$, rotating within a ring or eccentric-strap F, to which a connecting-rod or eccentric-rod G is attached. The upper end of the eccentric-rod is formed into a yoke $f$, and the opposite ends of the said yoke are pivoted to a sliding block H, which is adapted to slide back and forth within a slot or opening $h$ in the rocker-arm I. The exact formation of this sliding block and the mode of its connection with the rocker-arm are clearly illustrated in Fig. 3, where the said block appears as of a T shape adapted to rest against the guides J J, formed on the side of the rocker-arm. To one side of the sliding block I is secured a bracket $i$, which carries an internally-screw-threaded tube or nut $j$, adapted to engage with a screw-threaded rod or shaft K. The said rod or shaft is supported in journals $k$ $k$ on one side of the rocker-arm and carries at its inner end a gear-wheel $k'$, which engages with a worm $l$ on the lower end of the shaft L. This last-named shaft may be operated by an electric motor M, suitably mounted on a bracket $m$ on the rocker-arm. The connection of the rocker-arm with the rock-shaft and the control of the valve cut-off by the latter are in no way different from what is ordinarily the construction in modern steam-engines, and it is not necessary to give details of such connection and operation.

In Figs. 1 and 2 is shown a six-point switch N, having the terminals $n$ $n$ $n$ and $n'$ $n'$ $n'$. By operating the switch to the right or left, as the case may be, the motor M will rotate in one direction or the reverse and so move the sliding block as the operator desires. In the drawings the switch-arms are shown in such position as to leave the switch open. If we assume that the movement of the upper ends of the switch-arms to the left, bringing them into contact with the contact-terminals $n$ $n$ $n$, will operate the motor M in such a direction as to move the sliding block inward, then the reversal of the switch so as to bring the lower arms thereof into contact with the terminals $n'$ $n'$ $n'$ will, through the medium of the motor M, move the sliding block outward. Thus the position of the sliding block is under the certain control of the switch operator. If he finds that the engine is running too fast, he can cause the sliding block to be moved farther out and so lessen the valve-opening in a manner well understood. If it is running too slow, he can reverse the operation.

Besides the switch devices I illustrate in Fig. 2 certain arrangements and devices for indicating when the sliding block H has reached one of its extreme positions within the slot $h$. For convenience I illustrate a converter O with its primary connected to two of the bus-bars 1 2 3 4 and having its secondary circuits so connected up as to contain two electric lamps or other indicating devices $o$ $o'$ and two normally-closed switches $s$ $s'$. Referring to the switch $s$ at the right end of the rocker-arm, it has two binding-posts $b$ $b'$, the former connected to the connecting tube or thimble $t$ and to a conducting-collar $c$, secured within the end thereof, while the latter is joined by an insulated wire 6 to a conducting-button $d$, having a non-conducting handle $g$. The switch $s'$ is exactly similar to the switch $s$ in its general construction. When the apparatus is in operation, it is my design to have the lamps $o$ $o'$ burning. Then in case the sliding block H is moved to the right, so as to push against the handle $g$ and move the button $d$ away from the collar $c$, the circuit of the lamp $o$ will be broken and this lamp will be extinguished, whereby the switch operator will be informed that the sliding block has practically reached the limit of its movement. He will accordingly throw the switch N to open position, thus stopping the further movement of the sliding block. In case he has moved the block too far he will reverse the switch and permit the motor to move the sliding block backward to the extent desired.

In Fig. 3 I show the means whereby the actual position of the sliding block can be determined within small limits. In this figure I have shown a series of lamps 7, 8, 9, 10, and 11, each included in a branch of the secondary circuit of the converter O'. The other side of the converter is connected by wire 12 with an insulated contact-piece 13, attached to the sliding block H. This piece coöperates with a series of insulated contact-pieces 14, 15, 16, 17, and 18, which are severally in circuit with the lamps 11, 10, 9, 8, and 7, respectively. In the position illustrated in the figure the contact-piece 13 is in contact with the piece 15. Accordingly the lamp 10 is supposed to be ignited. Should the sliding block move farther outward, the lamp 10 would be extinguished and the lamps 9, 8, and 7 would be successively ignited. With these lamp devices on his switchboard the switch operator knows precisely where the sliding block is on each of the rocker-arms, and he can control these blocks accordingly. In Fig. 1 I have illustrated only the means for indicating when the sliding block has reached approximately the limits of its to-and-fro movement. The devices illustrated in Fig. 3 may be substituted for this apparatus.

W in Fig. 1 represents two converters, each of which has its secondary in circuit with the same synchronizing-lamp W'. The primaries of the said converters are connected with the main lead-wires of the same phase from the alternators C and D. On the station-switchboard is a four-point switch 20 for connecting the circuits of the alternator C with the bus-bars, and on the same switchboard is a switch 21, which performs the same office for the circuits of the alternator D. It will be seen that the last-named switch is closed, the said alternator D being in operation and supplying the circuits which lead from the bus-bars 1, 2, 3, and 4. In other words, the engine B is at work and is driving the alternator D. Should it now become necessary to throw the alternator C into the circuit, the operation of accomplishing this is as follows: The engine A is set in operation and brought to the point where its speed is approximately the same as that of the engine B. By the use of the devices described in the present specification I am then able to bring the speed of the engine A to practically the exact speed of engine B in a very brief space of time. Now in order to test the electrical conditions of the circuit and to insure that the current phases of the two generators shall be alike before the second alternator is thrown in I close the circuits of the alternators C and D through the converters W, thus utilizing the lamp W' as a synchronizing test in the usual manner. So long as the speeds of the two alternators vary to an appreciable extent the current phases also vary and the lamp W' flickers rapidly; but as the speeds of the two driving-engines approximate each other more closely, at the same time bringing the current phases more and more into unison, the flickering will become slower and will gradually die down until the lamp indicates that the machines are running in the same phase for a sufficient period of time to make it possible to close the switch. At this moment the operator throws the alternator C into circuit by means of the switch 20. The new alternator having been thus thrown into circuit with one or more others, as described, synchronism is easily maintained and the load is kept properly divided by the operator at the switchboard, who, by observing the indications of the various ammeters, (shown at 29, 30, 31, and 32, Fig. 1,) can tell which alternator is lagging or leading, whereupon he can take the necessary steps for putting it in condition to receive its share of the load—no more and no less. Ordinarily he will bring up the engine which drives the lagging alternator to a little higher speed, although he may, if the circumstances seem to call for it, reduce the speed of the engine driving the leading alternator. In either case he will accomplish what he wishes by properly shifting the position of the sliding block in the rocker-arm of the engine which drives one or the other of the said alternators. The same mode of control can be applied in the same manner to the operation of direct-current machines and can be employed with engines using compressed air or any other suitable working medium.

The invention claimed is—

The herein-described method of regulating alternating or direct current generators, and arranging them in parallel circuit while in operation, which consists in bringing the several generators independently to a determined speed by adjusting the time of admission of steam or other working medium to the engines and subsequently switching them into circuit.

Signed at New York, in the county of New York and State of New York, this 9th day of May, A. D. 1900.

HERBERT W. YORK.

Witnesses:
GEORGE H. STOCKBRIDGE,
WM. H. CAPEL.